(12) United States Patent
Jeong

(10) Patent No.: US 8,401,534 B2
(45) Date of Patent: Mar. 19, 2013

(54) MOBILE COMMUNICATION TERMINAL AND METHOD FOR CONTROLLING THE SAME

(75) Inventor: Jong Woo Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 1049 days.

(21) Appl. No.: 11/797,298

(22) Filed: May 2, 2007

(65) Prior Publication Data
US 2007/0259656 A1 Nov. 8, 2007

(30) Foreign Application Priority Data
May 3, 2006 (KR) ........................ 10-2006-0040122

(51) Int. Cl.
*H04W 3/00* (2006.01)

(52) U.S. Cl. ............. 455/418; 455/420; 455/186.1; 455/183.2

(58) Field of Classification Search ............ 455/186.2
See application file for complete search history.

(56) References Cited

U.S. PATENT DOCUMENTS

| 5,418,837 | A | * | 5/1995 | Johansson et al. | 455/558 |
| 6,052,381 | A | * | 4/2000 | Henriksson et al. | 370/465 |
| 6,823,450 | B2 | * | 11/2004 | Ott | 713/1 |
| 6,941,136 | B2 | * | 9/2005 | Study et al. | 455/419 |
| 7,187,919 | B2 | * | 3/2007 | Fukuzato | 455/410 |
| 7,260,381 | B2 | * | 8/2007 | Lipsit | 455/411 |
| 2004/0146274 | A1 | | 7/2004 | Ishibashi | |
| 2005/0287995 | A1 | * | 12/2005 | Yoon | 455/414.1 |

FOREIGN PATENT DOCUMENTS

| KR | 10-2004-0011513 A | 2/2004 |
| KR | 10-2004-0013455 A | 2/2004 |
| KR | 10-2004-0066014 A | 7/2004 |
| KR | 10-2004-0067242 A | 7/2004 |

* cited by examiner

*Primary Examiner* — Kwasi Karikari
(74) *Attorney, Agent, or Firm* — Birch, Stewart, Kolasch & Birch, LLP

(57) ABSTRACT

A mobile communication terminal and a method for controlling the mobile communication terminal are discussed. According to an embodiment, the mobile communication terminal includes at least two memories to store data; and a controller, wherein if the controller loses its control authority for one of the at least two memories while certain data is read and processed from the one of the at least two memories, the controller reads and processes the same certain data or related data stored in another one of the at least two memories.

24 Claims, 3 Drawing Sheets

MOBILE COMMUNICATION TERMINAL AND METHOD FOR CONTROLLING THE SAME

CROSS-REFERENCE TO RELATED APPLICATIONS

The present application claims priority to Korean Patent Application No. 10-2006-0040122, filed in Korea on May 3, 2006, the entire contents of each is incorporated herein by reference.

BACKGROUND OF THE INVENTION

1. Field of the Invention

This document relates to a mobile communication terminal and a method for controlling the mobile communication terminal.

2. Discussion of Related Art

With the advanced convergence technologies for a mobile communication terminal, the mobile communication terminal has been provided with various multimedia functions such as a camera function, an MP3 function, a camcorder function, and others. In order to fully use these multimedia functions, a large-capacity memory for storing various contents has been required.

Recently, the mobile communication terminal could mount a large capacity external memory to support the insufficient capacity of a built-in memory. The external memory of the mobile communication terminal has been provided in the form of a detachably mounted memory card and thus, if necessary, could expand its memory capacity. The external memory has been usefully used to store a large amount of data. For example, the external memory can be used to store an MP3 file being played by the MP3 player function or a moving image file being played by the camcorder function, and used as a portable storage medium for carrying data.

However, when the mobile communication terminal is being used as the portable storage medium that can download and upload data, by connecting the mobile communication terminal, in which the external memory is mounted, to a host system such as a computer, a notebook, and others, the mobile communication terminal cannot access its external memory, because the host system currently has authority (access control) over the external memory of the mobile communication terminal to store and fetch the data in/from the external memory.

Therefore, when a mobile communication terminal according to the related art is connected with the host system while the data stored in the external memory of the mobile communication terminal is being processed by the mobile communication terminal, the data processing by the mobile communication terminal is interrupted since the host system takes control over the external memory of the mobile terminal. For example, when the mobile communication terminal is connected with the computer while a music file stored in the external memory is being played in the mobile terminal, the playing of the music file will be interrupted since the computer (host) blocks access to the external memory storing the music file.

SUMMARY

Accordingly, the present invention has been made to address the above-mentioned and other problems associated with the related art.

Additional advantages, objects and features of the invention will be set forth in part in the description which follows and in part will become apparent to those having ordinary skill in the art upon examination of the following or may be learned from practice of the invention.

According to an aspect of the present invention, there is provided a mobile communication terminal, comprising: at least two memories storing data; and a controller, if the controller loses authority for one (i.e., available memory) of the at least two memories while the data is read and processed, reading and processing the data stored in the other memory.

According to another aspect of the present invention, there is provided a mobile communication terminal, comprising: a memory, partitioned into at least two partitions, storing data; and a controller, if the controller loses authority for one (i.e., available partition) of the at least two partitions while the data is read and processed, reading and processing the data stored in the other partition.

Accordingly to an embodiment, the mobile communication terminal further comprises an external interface connecting to an external device, wherein if the authority for the available memory or partition is transferred to a host system operating as a master connected to the external interface, the controller reads and processes the data stored in the other memory or partition.

According to still another aspect of the present invention, there is provided a method for controlling a mobile communication terminal comprising: if a controller loses authority for one (i.e., available memory) of at least two memories while data is read and processed, reading and processing the data stored in the other memory.

According to still another aspect of the present invention, there is provided a method for controlling a mobile communication terminal comprising: if a controller loses authority for one (i.e., available partition) of at least two partitions while the data is read and processed, reading and processing the data stored in the other partition.

The at least two memories may comprise a built-in memory installed in a body and a detachably mounted external memory.

The authority for the available memory or partition may be lost by being transferred to a host system operating as a master connected to the external interface.

According to another aspect, the present invention provides a mobile terminal, comprising: at least two memories to store data; and a controller, wherein if the controller loses its control authority for one of the at least two memories while certain data is read and processed from the one of the at least two memories, the controller reads and processes the same certain data or related data stored in another one of the at least two memories.

According to another aspect, the present invention provides a mobile terminal, comprising: a memory partitioned into at least two partitions and configured to store data; and a controller, wherein if the controller loses its control authority for one of the at least two partitions while certain data is read and processed from the one of the at least two partitions, the controller reads and processes the same certain data or related data stored in another one of the at least two partitions.

According to another aspect, the present invention provides a mobile communication terminal, comprising: a built-in memory installed in a body of the mobile communication terminal; an external memory detachably mounted in the mobile communication terminal; an external interface connecting to an external device; and a controller, wherein if control authority for the external memory is transferred to a host system connected to the external interface while data stored in the external memory is read and processed, the controller determines whether the data stored in the external memory is also stored in the built-in memory to process the data.

According to another aspect, the present invention provides a method for controlling a mobile terminal, the mobile terminal including at least two memories and a controller, the method comprising: (a) reading and processing certain data from one of the at least two memories; and (b) if the controller loses its control authority for the one of the at least two memories while the certain data is read and processed from the one of the at least two memories, reading and processing the same certain data or related data stored in another one of the at least two memories.

According to another aspect, the present invention provides a method for controlling a mobile terminal, the mobile terminal including a controller and a memory partitioned into at least two partitions, the method comprising (a) reading and processing certain data from one of the at least two partitions; and (b) if the controller loses its control authority for the one of the at least two partitions while the certain data is read and processed from the one of the at least two partitions, reading and processing the same certain data or related data stored in another one of the at least two partitions.

According to another aspect, the present invention provides a method for controlling a mobile communication terminal, the terminal including a built-in memory and a detachably mounted external memory, the method comprising: reading and processing data from the detachably mounted external memory according to a user's selection; determining whether a host system operating as a master is connected with the mobile communication terminal, while the data stored in the external memory is read and processed; if the host system operating as the master is connected, determining whether control authority for the external memory is transferred to the host system; if the control authority for the external memory is transferred to the host system, determining whether the data is stored in the built-in memory; and if the data is stored in the built-in memory, processing the data from the build-in memory.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The aspects of the present invention will be more apparent by describing certain exemplary embodiments of the present invention with reference to the accompanying drawings, in which.

DETAILED DESCRIPTION

Figure 1:
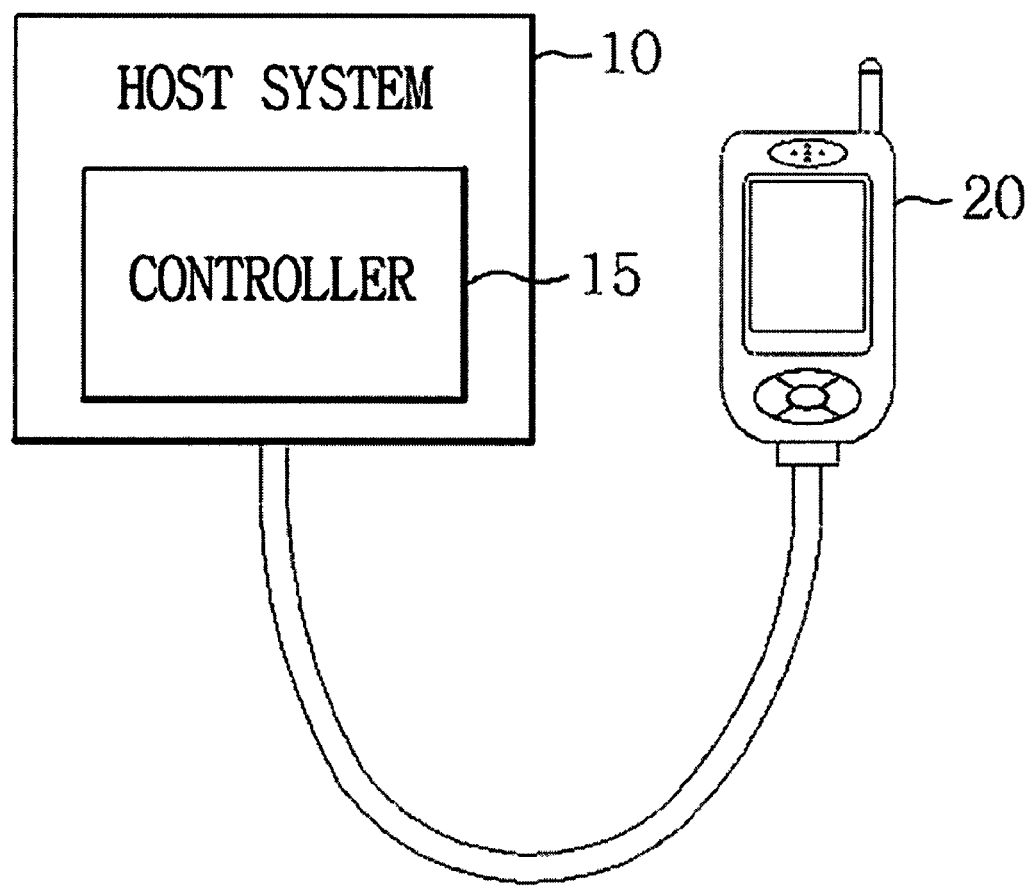
FIG. 1 is a diagram illustrating a state that a host system is connected with a mobile communication terminal having at least one memory, according to an exemplary embodiment of the present invention.

Hereinafter, exemplary embodiments of the present invention will be described in detail with reference to the accompanying drawings. The aspects and features of the present invention ad methods for achieving the aspects and features will be apparent by referring to the embodiments to be described in detail with reference to the accompanying drawings. However, the present invention is not limited to the embodiments disclosed hereinafter, but can be implemented in diverse forms.

The matters defined in the description, such as the detailed construction and elements, are nothing but specific details provided to assist those of ordinary skill in the art in a comprehensive understanding of the invention, and the present invention is defined within the scope of the appended claims. In the entire description of the present invention, the same drawing reference numerals are used for the same elements across various figures.

FIG. 1 is a diagram illustrating a state that a host system is connected with a mobile communication terminal having at least one memory, according to an exemplary embodiment of the present invention.

Referring to FIG. 1, a mobile communication terminal (or mobile terminal) 20 is connected to a host system 10 via a cable to download or upload data from/to the host system 10. Accordingly, the mobile communication terminal 20 can be usefully used as a portable storage medium.

The mobile communication terminal 20 can perform data communication with an external apparatus, e.g., the host system 10, using a USB interface. For example, the mobile communication terminal 20 is connected with the host system 10 via a USB cable to send and receive data, where the host system 10 is equipped with a controller 15 using a USB interface technology.

The host system 10 may be a computer such as a desktop or workstation, a notebook, terminal(s) such as a personal digital assistant (PDA), various server(s), etc. The host system 10 can also operate as a master when it is connected with the mobile communication terminal 20.

Figure 2:
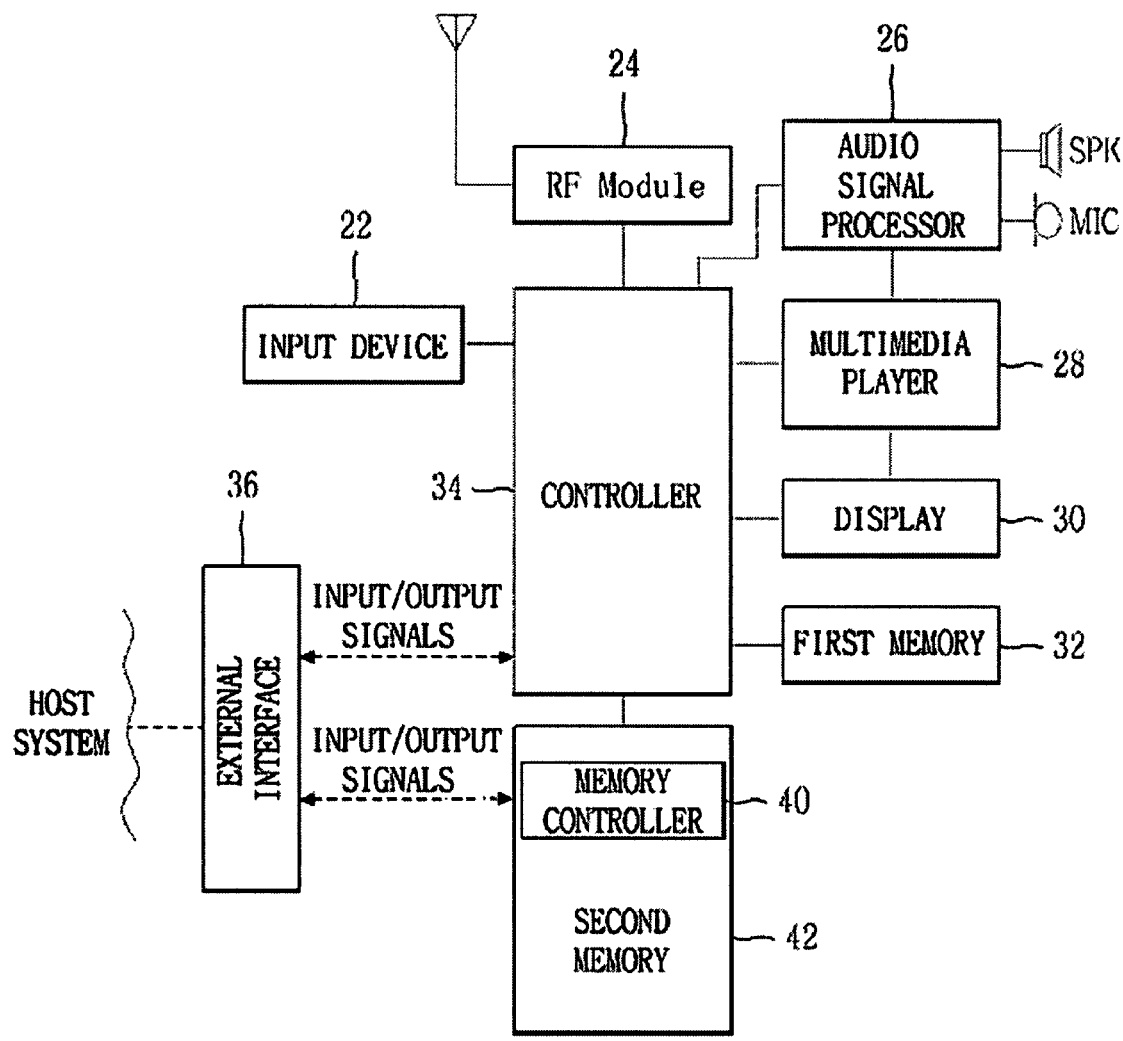
FIG. 2 is a block diagram illustrating an example of a mobile communication terminal according to an exemplary embodiment of the present invention.

FIG. 2 is a block diagram illustrating an example of the mobile communication terminal 20 according to an exemplary embodiment of the present invention.

Referring to FIG. 2, the mobile communication terminal 20 includes a RF module 24 for sending and receiving data wirelessly, an audio signal processor 26 for processing an audio signal that is inputted and outputted through a speaker (SPK) and a microphone (MIC), an input device 22 for receiving inputs from a user, a display 30 for displaying data and other information and images, a multimedia player 28 for playing a multimedia file, and a controller 34 for controlling the RF module 24 and the audio signal processor 26 to perform communication functions such as a call function and controlling the multimedia player 28 to play a multimedia contents so that the data of the multimedia contents is displayed on the display 30, according to the user's selection through the input device 22. The input device 22 can be a keypad, buttons, a touch-sensitive screen, etc.

The mobile communication terminal 20 also includes first and second memories 32 and 42 for storing data and information, and an external interface 36 for connecting to an external apparatus such as the host system 10. Additional memories can be further provided in the terminal 20. If the controller 34 loses its authority for one (i.e., available memory) of the first and second memories 32 and 42 (e.g., if the controller 34 loses its authority to access the one memory) while the data in that one memory is being read and processed, the controller 34 determines whether the data is stored in the other of the first and second memories 32 and 42 to process the corresponding data.

If the terminal 20 has three or more memories, then the controller 34 can check all the memories (excluding the one memory) to see if the same (or similar or related) data that is stored in the one memory is stored therein. If so, the controller 34 can continuously reproduce the same data from the other memories.

The mobile terminal 20 can include other known components, and all components of the mobile terminal 20 and the host system 10 are operatively couples and configured.

The first memory 32 is a built-in memory installed in the mobile communication terminal 20 itself, and the second memory 42 is a detachably/attachably mounted memory. The first and second memories 32 and 42 can store predetermined contents. The second memory 42 can be provided with a memory controller 40 for controlling, storing and fetching data to/from the second memory 42. The memory controller 40 performs the control of the second memory 42 so that data from the outside is stored in the second memory 42. If a data read signal is applied to the memory controller 40, the corresponding data is read from the second memory 42 and provided to the outside, e.g., via the external interface 36.

The external interface 36 supports a function for sending and receiving data between the mobile communication terminal 20 and the host system 10. Preferably, in one example, the external interface 36 is a 24 pins USB interface according to Korea Information Communication Standard (KICS), but is not limited thereto. If the host system 10 such as a computer system is connected to the external interface 36, the host system 10 is operated as a master and the mobile communication terminal 20 is operated as a slave. In this case, the host system 10 applies input and output signals to the mobile communication terminal 20. As a result thereof, the host system 10 can control an operation of the controller 34 and instead of the controller 34, the host system 10 can have authority to control the memory controller 40.

When the authority to control the memory controller 40 for accessing the second memory 42 is transferred to the host system 10 connected to the external interface 36 while the contents stored in the second memory 42 are read under the control of the memory controller 40 and processed through the multimedia player 28, the controller 34 searches for the contents stored in the first memory 32 in order to continuously process the contents stored in the second memory 42.

For example, if the authority to control or access the second memory 42 is transferred to the host system 10 connected to the external interface 36 while a music contents stored in the second memory 42 is being played through the multimedia player 28, the controller 34 searches the first memory 32 for the same music contents to play the music contents continuously, thereby preventing the playing of the music contents from being interrupted.

On the other hand, if the authority to control or access the second memory 42 is transferred to the host system 10 connected to the external interface 36 while the music contents (e.g., "123.MP3") stored in the available second memory 42 is being played through the multimedia player 28, the controller 34 determines whether the same music contents "123.MP3" as that stored in the available second memory 42 is stored in the first memory 32. As a result of this determination, if so, the controller 34 continues to play the music contents "123.MP3" using the music contents "123.MP3" stored in the first memory 32, thereby preventing the playing of the music contents from being interrupted.

If the music contents (e.g., "123.MP3") stored in the available second memory 42 is not stored in the first memory 32, the music contents (e.g., "456.MP3") of the same or similar file form from the first memory 32 can be played by the multimedia player 28. Additionally, if the music contents (e.g., "456.MP3") of the same or similar file form does not exist or is not available, music contents of some form other than the MP3 form can be played by the multimedia player 28.

In another example, the controller 34 determines whether the same data as that stored in the available second memory 42 is stored in the first memory 32 (or any other memory). If not, the controller 34 copies the data stored in the second memory 42 to the first memory 32 and then reads the copied data from the first memory 32 for processing and reproduction.

For example, if the authority to control or access the second memory 42 is transferred to the host system 10 connected to the external interface 36 while the music contents (e.g., "123.MP3") stored in the available second memory 42 is being played through the multimedia player 28, the controller 34 determines whether the same music contents "123.MP3" as that stored in the second memory 42 is stored in the first memory 32. If so, the controller 34 plays the same music contents "123.MP3" whereas if not, the controller 34 can play the music contents "123.MP3" from the first memory 32 after copying the music contents "123.MP3" from the second memory 42 to the first memory 32, thereby the desired music contents can be played continuously even when the terminal's external memory 42 is being used to download/upload data from/to another device/server.

Figure 3:
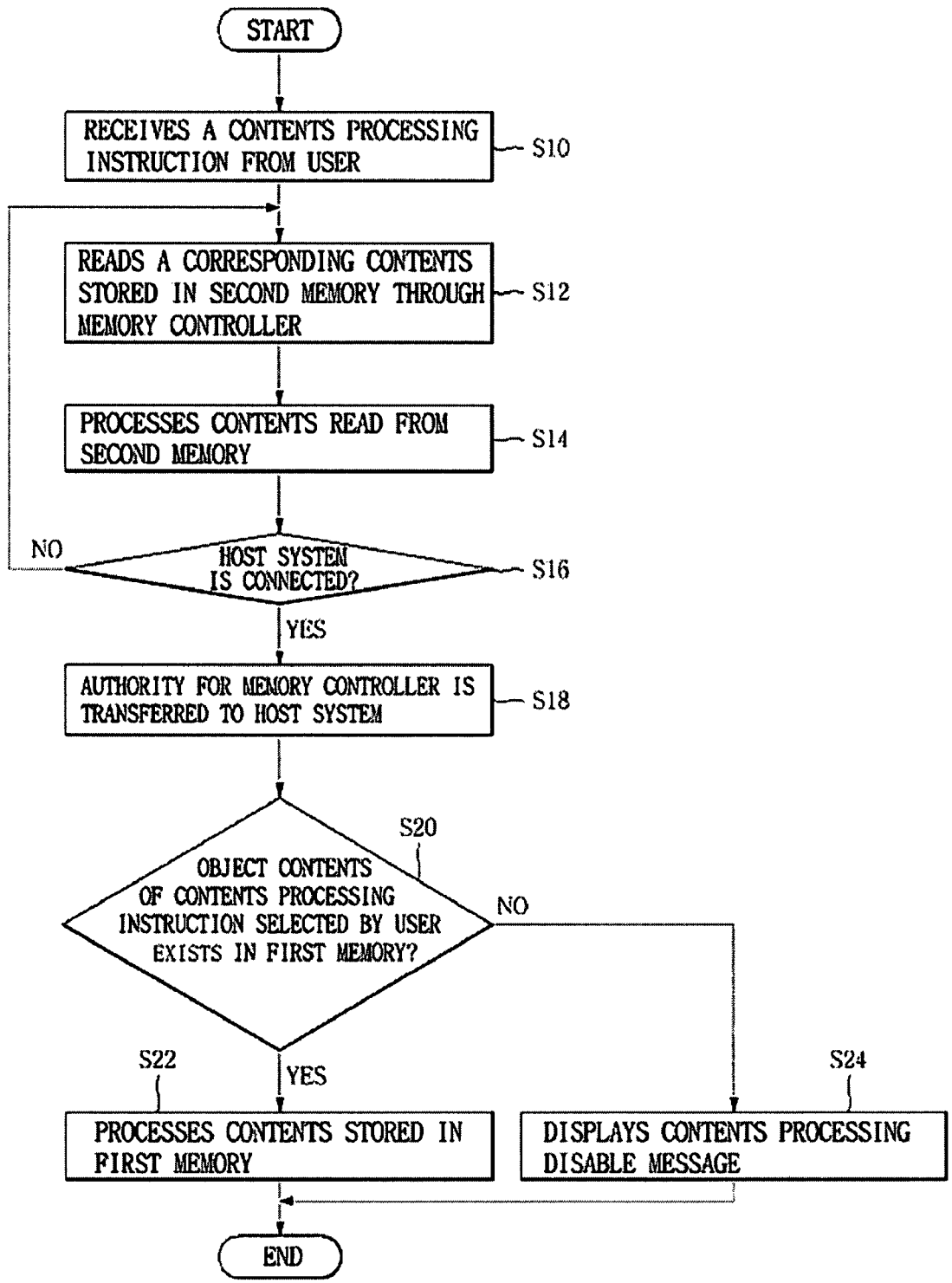
FIG. 3 shows a flow chart illustrating a method for controlling a mobile communication terminal according to an exemplary embodiment of the present invention.

FIG. 3 shows a flow chart illustrating a method for controlling a mobile communication terminal according to an exemplary embodiment of the present invention. This method is implemented in the mobile terminal and host system of FIGS. 1 and 2, but can be implemented in different device/system.

If a process instruction for certain contents stored in the second memory 42 (i.e., external memory) is received, e.g., from a user through the input device 22 (S10), the controller 34 searches for the requested contents through the memory controller 40 in the second memory 42 and reads the searched contents from the second memory 42 (S12). Next, the controller 34 processes and plays the contents read from the second memory 42 through the multimedia player 28 or other component (S14). Accordingly, the controller 34 performs the control operation over the second memory 42 so that the music contents, the moving image contents and others are played therefrom.

Next, the controller 34 determines whether the host system 10 (or the like) operating as a master is connected to be mobile terminal 20 while the contents stored in the second memory 42 are processed (S16). If the host system 10 is connected, the authority to control the memory controller 40 (and thus the memory 42) is transferred to the host system 10 (S18). Then, the controller 34 cannot use the second memory 42 and cannot access the contents stored in the second memory 42.

The controller 34 then searches the first memory 32 (i.e., built-in memory) to determine whether the object contents selected by the user exists (S20). For example, the controller 34 determines whether music contents is stored in the first memory 32, if the user has selected a music play function, or determines whether moving image contents is stored in the first memory 32, if the user has selected a moving image play function. In another example, the controller 34 searches the first memory 32 for the same (or similar) contents as the contents played from the second memory 42. The contents of the second memory 42 can be copied to the first memory 32 previously.

If the determination at step S20 indicates that the searched object contents is not present in the first memory 32, a contents disable message is displayed on the terminal 20 (S24). If, however, the object contents is found in the first memory 32, the controller 34 reads and processes the searched contents (or associated contents) from the first memory 32 (S22). As a result, even when the mobile communication terminal 20 is connected to the host system operating as the master, the functions selected by the user can be continuously performed.

As described above, if the authority to control or access the external memory is lost by the connection to the host system operating as the master while the contents stored in the external memory is processed, the controller of the mobile terminal according to the invention searches for the contents from the built-in memory to process the searched contents, thereby allowing the functions selected by the user to be continuously performed.

According to the embodiments of the present invention, although the mobile communication terminal 20 includes the first memory 32 (i.e., built-in memory) and the second memory 42 (i.e., external memory), the invention is not limited thereto. For instance, the mobile terminal can have three or more memories.

In addition, the object data may be various data including contents such as music, moving images, video clips and others.

According to the embodiments of the present invention, the mobile communication terminal 20 reads data from the first memory 32 to process the read data, when the terminal 20 loses its authority to control the second memory 42. Alternatively, the present invention partitions the first memory 32 and/or the second memory 42 into a plurality of partitions, which may be separately accessible. If the controller 34 loses its authority to control (e.g., to access) at least one of the partitions of the second and/or first memory, the same or similar data can be read from the other partition(s) of the same memory and/or the other memory.

For example, in case where the first memory 32 stores programs or software related to a system operation and the second memory 42 stores execution files, when the authority to control the second memory 42 is transferred from the mobile terminal to the host system connected to the external interface after partitioning the second memory 42 into a plurality of partitions, the authority to control only a part of the partitions of the second memory 42 is transferred from the mobile terminal to the host. Accordingly, if the authority to control one such partition is lost by the mobile terminal while the data is read and processed from that one partition, data stored in the other partition(s) of the second memory 42 can be read and processed by the mobile terminal to continuously perform the data processing.

The present invention can be implemented by various combination of the above-described memories, and use various memories that may be developed presently and in future.

The embodiments of the present invention have been described for illustrative purposes, and those skilled in the art will appreciate that various modifications, additions and substitutions are possible without departing from the scope of the present invention should be defined by the appended claims and their legal equivalents.

What is claimed is:

1. A mobile communication terminal, comprising:
at least two memories to store data; and
a controller,
wherein the controller is configured such that when control authority for one of the at least two memories is transferred from the controller to an external device while specific data is read and processed from the one of the at least two memories, the controller reads and processes the same data as the specific data or related data to the specific data from another one of the at least two memories,
wherein the controller is configured to determine whether the same data is stored in the another one of the at least two memories;
wherein when the controller determines that the same data is stored in the another one of the at least two memories, the controller reads and processes the same data from the another one of the at least two memories, and
when the controller determines that the same data is not stored in the another one of the at least two memories, the controller reads and processes the related data from the another one of the at least two memories.

2. The mobile communication terminal of claim 1, further comprising:
an external interface to connect with the external device,
wherein when the external device is connected with the external interface, the control authority for the one of the at least two memories is transferred from the controller to the external device, such that the controller stops reading the specific data from the one of the at least two memories, and reads and processes the same data or related data stored in the another one of the at least two memories.

3. The mobile communication terminal of claim 1, wherein the specific data is a music file or a moving image file.

4. The mobile communication terminal of claim 1, wherein the specific data is a music file or a moving image file.

5. The mobile communication terminal of claim 1, wherein the another one of the at least two memories is a built-in memory installed in the mobile communication terminal, and the one of the at least two memories is a detachably mounted external memory.

6. The mobile communication terminal of claim 1, wherein the external device includes at least one of a desktop, a workstation, a notebook, a personal digital assistant, and a server.

7. A mobile communication terminal, comprising:
at least two memories to store data; and
a controller,
wherein the controller is configured such that when control authority for one of the at least two memories is transferred from the controller to an external device while specific data is read and processed from the one of the at least two memories, the controller reads and processes the same data as the specific data or related data to the specific data from another one of the at least two memories,
wherein the controller is configured to determine whether the same data is stored in the another one of the at least two memories,
wherein when the controller determines that the same data is stored in the another one of the at least two memories, the controller reads and processes the same data from the another one of the at least two memories, and
when the controller determines that the same certain data is not stored in the another one of the at least two memories, the controller reads and processes a copy of the specific data after copying the specific data from the one of the at least two memories into the another one of the at least two memories.

8. The mobile communication terminal of claim 7, wherein the at least two memories includes:
   a built-in memory installed in a body of the mobile communication terminal; and
   an external memory detachably mounted in the mobile communication terminal.

9. A mobile communication terminal, comprising:
   a memory partitioned into at least two partitions and configured to store data; and
   a controller,
   wherein the controller is configured such that when control authority for one of the at least two partitions is transferred from the controller to an external device while specific data is read and processed from the one of the at least two partitions, the controller reads and processes the same data as the specific data or related data to the specific data from another one of the at least two partitions,
   wherein the controller is configured to determine whether the same data is stored in the another one of the at least two partitions,
   wherein when the controller determines that the same data is stored in the another one of the at least two partitions, the controller reads and processes the same data from the another one of the at least two partitions, and
   when the controller determines that the same data is not stored in the another one of the at least two partitions, the controller reads and processes the related data from the another one of the at least two partitions.

10. The mobile communication terminal of claim 9, further comprising:
    an external interface to connect with the external device, wherein when the external device is connected with the external interface, the control authority for the one of the at least two partitions is transferred from the controller to the external device, such that the controller stops reading the specific data from the one of the at least two partitions, and reads and processes the same data or related data stored in the another one of the at least two partitions.

11. The mobile communication terminal of claim 9, wherein the specific data is a part of the execution files.

12. The mobile communication terminal of claim 9, wherein the specific data is a music file or a moving image file.

13. The mobile communication terminal of claim 9, wherein the external device includes at least one of a desktop, a workstation, a notebook, a personal digital assistant, and a server.

14. A mobile communication terminal, comprising:
    a memory partitioned into at least two partitions and configured to store data; and
    a controller,
    wherein the controller is configured such that when control authority for one of the at least two partitions is transferred from the controller to an external device while specific data is read and processed from the one of the at least two partitions, the controller reads and processes the same data as the specific data or related data to the specific data from another one of the at least two partitions,
    wherein the controller is configured to determine whether the same data is stored in the another one of the at least two partitions,
    wherein when the controller determines that the same data is stored in the another one of the at least two partitions, the controller reads and processes the same data from the another one of the at least two partitions, and
    when the controller determines that the same data is not stored in the another one of the at least two partitions, the controller reads and processes a copy of the specific data after copying the specific data from the one of the at least two partitions into the another one of the at least two partitions.

15. A method for controlling a mobile communication terminal, the mobile communication terminal including at least two memories and a controller, the method comprising:
    (a) reading and processing specific data by the controller from one of the at least two memories;
    (b) when control authority for the one of the at least two memories is transferred from the controller to an external device while the specific data is read and processed from the one of the at least two memories, reading and processing the same data as the specific data or related data to the specific data from another one of the at least two memories; and
    (c) determining whether the same data is stored in the another one of the at least two memories,
    wherein when the step (c) determines that the same data is stored in the another one of the at least two memories, the step (b) includes reading and processing the same data from the another one of the at least two memories, and
    when the step (c) determines that the same data is not stored in the another one of the at least two memories, the step (b) includes reading and processing the related data from the another one of the at least two memories.

16. The method of claim 15, wherein the specific data is a music file or a moving image file.

17. The method of claim 15, wherein the another one of the at least two memories is a built-in memory installed in the mobile communication terminal, and the one of the at least two memories is a detachably mounted external memory.

18. The method of claim 15, wherein the external device includes at least one of a desktop, a workstation, a notebook, a personal digital assistant, and a server.

19. A method for controlling a mobile communication terminal, the mobile communication terminal including at least two memories and a controller, the method comprising:
    (a) reading and processing specific data by the controller from one of the at least two memories;
    (b) when control authority for the one of the at least two memories is transferred from the controller to an external device while the specific data is read and processed from the one of the at least two memories, reading and processing the same data as the specific data or related data to the specific data from another one of the at least two memories; and
    (c) determining whether the same data is stored in the another one of the at least two memories,
    wherein when the step (c) determines that the same data is stored in the another one of the at least two memories, the step (b) includes reading and processing the same data from the another one of the at least two memories, and
    when the step (c) determines that the same data is not stored in the another one of the at least two memories, the step (b) includes reading and processing a copy of the specific data after copying the specific data from the one of the at least two memories into the another one of the at least two memories.

20. The method of claim 19, wherein the at least two memories include a built-in memory and a detachably mounted external memory.

21. A method for controlling a mobile communication terminal, the mobile communication terminal including a controller and a memory partitioned into at least two partitions, the method comprising:
- (a) reading and processing specific data by the controller from one of the at least two partitions;
- (b) when control authority for the one of the at least two partitions is transferred from the controller to an external device while the specific data is read and processed from the one of the at least two partitions, reading and processing the same data as the specific data or related data to the specific data from another one of the at least two partitions; and
- (c) determining whether the same data is stored in the another one of the at least two partitions,
- wherein when the step (c) determines that the same data is stored in the another one of the at least two partitions, the step (b) includes reading and processing the same data from the another one of the at least two partitions, and
- when the step (c) determines that the same data is not stored in the another one of the at least two partitions, the step (b) includes reading and processing the related data from the another one of the at least two partitions.

22. The method of claim 21, wherein the specific data is a music file or a moving image file.

23. The method of claim 21, wherein the external device includes at least one of a desktop, a workstation, a notebook, a personal digital assistant, and a server.

24. A method for controlling a mobile communication terminal, the mobile communication terminal including a controller and a memory partitioned into at least two partitions, the method comprising:
- (a) reading and processing specific data by the controller from one of the at least two partitions;
- (b) when control authority for the one of the at least two partitions is transferred from the controller to an external device while the specific data is read and processed from the one of the at least two partitions, reading and processing the same data as the specific data or related data to the specific data from another one of the at least two partitions; and
- (c) determining whether the same data is stored in the another one of the at least two partitions,
- wherein when the step (c) determines that the same data is stored in the another one of the at least two partitions, the step (b) includes reading and processing the same data from the another one of the at least two partitions, and
- when the step (c) determines that the same data is not stored in the another one of the at least two partitions, the step (b) includes reading and processing a copy of the specific data after copying the specific data from the one of the at least two partitions into the another one of the at least two partitions.

* * * * *